United States Patent
Bortell et al.

(10) Patent No.: US 11,084,061 B2
(45) Date of Patent: Aug. 10, 2021

(54) COMPOSITE MATERIALS HAVING A COATED EDGE AND METHODS THEREOF

(71) Applicants: PRODUCTIVE RESEARCH LLC, West Bloomfield, MI (US); MATERIAL SCIENCES CORPORATION, Canton, MI (US)

(72) Inventors: Peter Isaac Bortell, Tecumseh, MI (US); Bryan Joseph Tullis, Commerce Township, MI (US)

(73) Assignees: PRODUCTIVE RESEARCH LLC, West Bloomfield, MI (US); MATERIAL SCIENCES CORPORATION, Canton, MI (US)

( * ) Notice: Subject to any disclaimer, the term of this patent is extended or adjusted under 35 U.S.C. 154(b) by 123 days.

(21) Appl. No.: 16/494,828

(22) PCT Filed: Apr. 27, 2018

(86) PCT No.: PCT/US2018/029854
§ 371 (c)(1),
(2) Date: Sep. 17, 2019

(87) PCT Pub. No.: WO2018/200990
PCT Pub. Date: Nov. 1, 2018

(65) Prior Publication Data
US 2020/0038909 A1    Feb. 6, 2020

Related U.S. Application Data

(60) Provisional application No. 62/490,997, filed on Apr. 27, 2017.

(51) Int. Cl.
*B05D 7/02* (2006.01)
*B05D 7/00* (2006.01)
(Continued)

(52) U.S. Cl.
CPC ............... *B05D 7/58* (2013.01); *B05D 7/02* (2013.01); *B05D 7/14* (2013.01); *C23C 18/54* (2013.01);
(Continued)

(58) Field of Classification Search
CPC .................. B05D 7/14; B05D 7/56
See application file for complete search history.

(56) References Cited

U.S. PATENT DOCUMENTS

| | | |
|---|---|---|
| 2011/0162788 A1 | 7/2011 | Mizrahi |
| 2011/0188927 A1 | 8/2011 | Mizrahi |

(Continued)

FOREIGN PATENT DOCUMENTS

| | | |
|---|---|---|
| CN | 103590532 A | 2/2014 |
| JP | S61-280935 S | 12/1986 |

(Continued)

OTHER PUBLICATIONS

Fluorophores Guide, PROMEGA (https://www.promega.com/-/media/files/resources/.../fluorophoresguidepdf.pdf?la=en, as accessed on Apr. 27, 2018.

(Continued)

*Primary Examiner* — Austin Murata
(74) *Attorney, Agent, or Firm* — The Dobrusin Law Firm, P.C.

(57) ABSTRACT

Disclosed herein are articles having an edge that is partially, or entirely sealed with one or more coatings including a polymeric material. The article may include a coating selected so that one surface (e.g., a face surface) has a desired property (e.g., an appearance, such as a chrome appearance), and a second surface (e.g., a different face surface, or an edge surface) is covered with a different material, where the different coatings provide protection to at least the edge surface. Also disclosed are coating materials (Continued)

including a tracer component. Also disclosed are methods for coating a substrate. Also disclosed are methods for confirming the presence of a coating, particularly on an edge surface.

20 Claims, 5 Drawing Sheets

(51) Int. Cl.
*B05D 7/14* (2006.01)
*C23C 18/54* (2006.01)
*C25D 5/02* (2006.01)
*C25D 5/12* (2006.01)
*C25D 5/48* (2006.01)

(52) U.S. Cl.
CPC ............... *C25D 5/02* (2013.01); *C25D 5/12* (2013.01); *C25D 5/48* (2013.01)

(56) References Cited

U.S. PATENT DOCUMENTS

| | | |
|---|---|---|
| 2011/0200816 A1 | 8/2011 | Mizrahi et al. |
| 2013/0136944 A1 | 5/2013 | Mizrahi et al. |
| 2014/0162086 A1 | 6/2014 | Mizrahi |
| 2014/0286699 A1 | 9/2014 | Mizrahi |
| 2015/0328864 A1 | 11/2015 | Mizrahi et al. |
| 2016/0222999 A1 | 8/2016 | Mizrahi |
| 2016/0339674 A1 | 11/2016 | Mizrahi et al. |
| 2016/0339675 A1 | 11/2016 | Mizrahi |
| 2018/0029332 A1 | 2/2018 | Mizrahi et al. |
| 2018/0126700 A1 | 5/2018 | Mizrahi |
| 2018/0250914 A1 | 9/2018 | Mizrahi et al. |
| 2020/0001574 A1 | 1/2020 | Mizrahi et al. |

FOREIGN PATENT DOCUMENTS

| | | |
|---|---|---|
| JP | H09-295373 A | 11/1997 |
| JP | 2005-251673 A | 9/2005 |

OTHER PUBLICATIONS

International Search Report and Written Opinion, PCT Application No. PCT/US2018/029854 dated Oct. 11, 2018.

International Preliminary Report on Patentability, PCT Application No. PCT/US2018/029854 dated Oct. 29, 2019.

Cross-sectional view

Side View

Side view

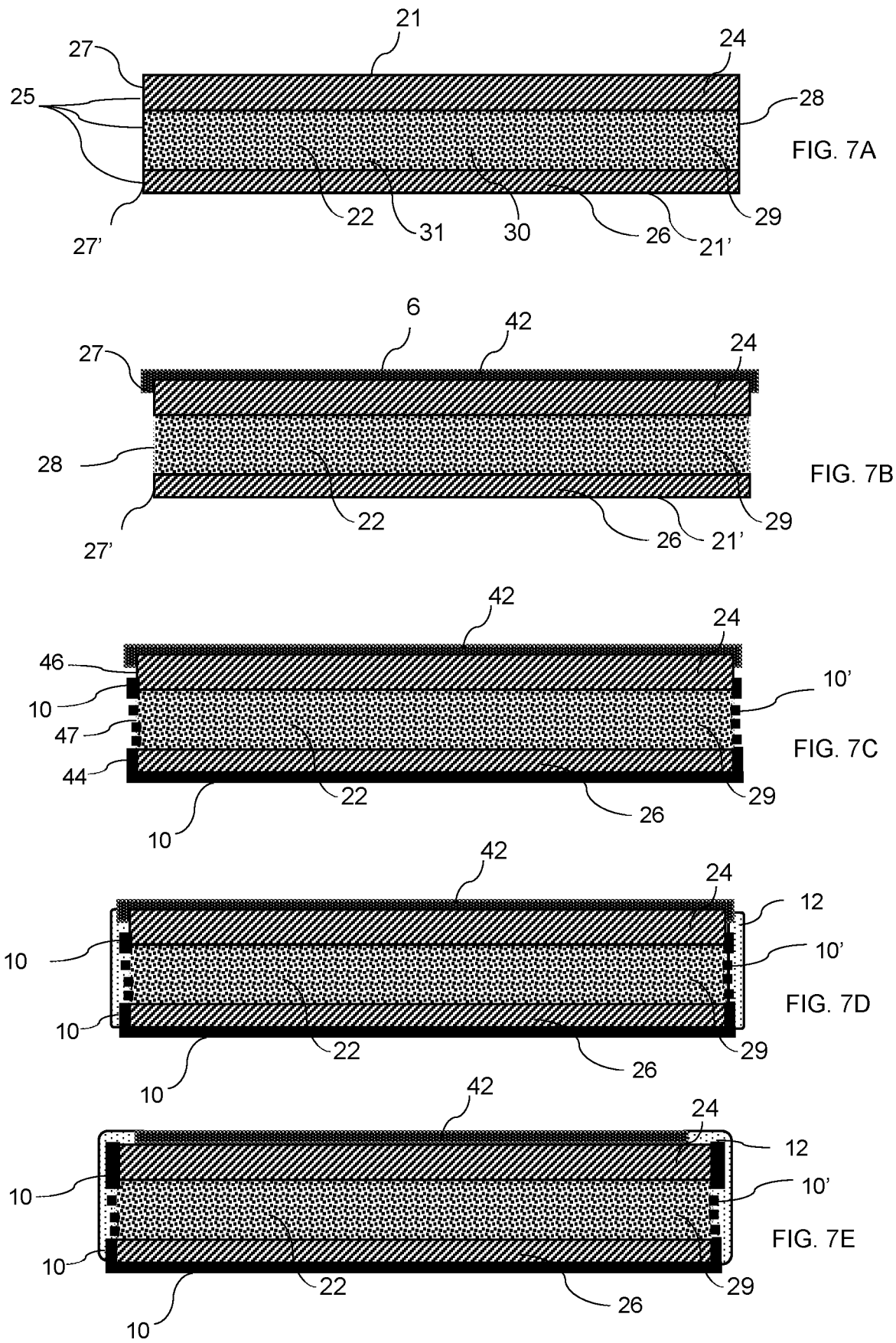

COMPOSITE MATERIALS HAVING A COATED EDGE AND METHODS THEREOF

CLAIM OF PRIORITY

The present application claims priority to U.S. Provisional Patent Application 63/490,997 filed on Apr. 27, 2017, incorporated herein by reference in its entirety for all purposes.

FIELD

The teachings herein relate to coated metallic materials and to coated composite materials (e.g., having a polymeric core layer sandwiched between metallic layers), including one or more polymeric covering layers and/or plating layers, and to methods of preparing the coated materials.

BACKGROUND

Substrate components having an exposed metallic surface may be susceptible to corrosion or other environmental damage.

In some instances, substrate components having a polymeric core and a metallic outer layer have been employed to reduce the weight of the article. However, such composite materials including a polymeric layer and metallic layers are difficult to cover, due to the different surface energies of the layers (e.g., on an edge surface where the metallic layers and the polymeric layer share a common surface).

Substrate components having an exposed metallic surface may be susceptible to corrosion or other environmental damage.

In some instances, substrate components having a polymeric core and a metallic outer layer have been employed to reduce the weight of the article. However, such composite materials including polymeric layers and metallic layers are difficult to cover, due to the different surface energies of the layers.

In some automotive applications, a thick anti-corrosion polymeric coating is spray applied to one side (e.g., a side that is generally hidden from view) of a component after plating the component (e.g., after chrome plating). This process is inefficient due to the limitations of handling the component after the chrome plating and the excess quantities of the anti-corrosion polymeric coating applied to ensure complete coverage. However, the anti-corrosion covering layer is generally an electrically insulating material and is applied prior to the chrome plating because it would result in uncovered regions adjacent to the anti-corrosion coating.

In some instances, a coating material may be difficult to observe (e.g., visually observe). For example, a coating may be clear, or colored to match the color of a layer which it covers. This may make it difficult to ensure that the coating is present and/or sufficient.

There is a need for new coated structures and/or new methods for preparing coated articles having both a polymeric material and a metallic material in the substrate structure and/or having both a polymeric covering material and a metallic coating material.

There is also a need for coatings which can be easily identified and for methods for identifying the presence of a coating, such as for ensuring quality of the coating or part. For example, there is a need for a clear adhesive material for coating an edge surface where the adhesive material is generally difficult to observe by an individual, but has one or more features (e.g., a tracer component) that enables qualitative or quantitative identification.

There is also a need for a quality control method for assuring that a clear adhesive layer has been applied on a surface (e.g., a surface of a composite material, such as a common edge surface including an edge of a polymer layer and an edge of one or more metal layers).

SUMMARY

One aspect according to the teachings herein is directed at an article comprising: a sandwich composite including a first metallic layer, a second metallic layer, and a polymeric core (i.e., a polymeric core layer), wherein the polymeric core layer has an edge surface; and a polymeric coating over the edge surface of the polymeric core layer; wherein the polymeric core layer includes a non-polar polymer; and the polymeric coating includes a polar polymer.

This aspect may be further characterized by one or any combination of the following: the article includes an adhesion promoting layer between the edge surface of the polymeric core layer and the polymeric coating; the adhesion promoting layer is a partial layer over the adhesion promoting layer and includes one or more metals (preferably including one or more plating layers, such as a plating layer(s) including chrome or nickel); the polymeric core layer includes metal particles and/or metal fibers (e.g., sufficient for at least partially plating and/or at least partially adhering to the adhesion promoting layer); or the article includes a non-polymeric layer between the edge surface of the polymeric core and the polymeric coating.

Another aspect according to the teachings herein is directed to a coated edge laminate article comprising: a first metal layer; a second metal layer; a polymeric core including one or more polymers interposed between the first and second metal layers, wherein the one or more polymers includes or consists of one or more non-polar polymers (preferably one or more non-polar thermoplastic polymers) as a major component; a common edge shared by the first metal layer, the second metal layer, and the polymeric core, wherein the first metal layer, the second metal layer and the polymeric core are joined together to define a laminate; and a cross-linked polymeric coating covering at least a portion of the common edge.

This aspect of may be further characterized by one or any combination of the following: the non-polar thermoplastic polymers are polyolefin homopolymers and/or polyolefin copolymers including about 90 weight percent or more (more preferably about 95 weight percent or more, even more preferably about 98 weight percent or more, and most preferably about 99 weight percent or more) of one or more olefins; the one or more polymers includes about 55 weight percent or more (preferably about 70 weight percent or more, more preferably about 83 weight percent or more, even more preferably about 92 weight percent or more, and most preferably about 95 weight percent or more) of the non-polymer thermoplastic polymers, based on the total weight of the one or more polymers; the polymeric coating covers at least 80 percent or more (preferably all) of a surface of the polymeric core along the common edge, based on the total area of the surface of the polymeric core along the common edge; the polymeric core includes metal fibers, metallic particles or both; the polymeric coating has one or more regions overlaying an edge surface of the metal layer(s); the average thickness of the one or more regions overlaying the edge surface of the metal layer(s) is about 0.001 mm or more (preferably about 0.002 mm or more, more preferably about 0.005 mm or more, even more preferably about 0.010 mm or more, and most preferably about 0.2 mm or more) and/or about 0.8 mm or less (preferably about 0.5 mm or less, more preferably about 1 mm or less, and most preferably about 0.05 mm or less); a ratio of a thickness of the polymeric coating (e.g., in a direction normal to the common edge) to the thickness of the article (e.g., in a direction normal to a face surface of the metal layers) is about 0.001 or more, about 0.002:1 or more, about 0.005:1 or more, or about 0.010 or more, and/or about 0.9:1 or less, about 0.7:1 or less, or about 0.5:1 or less (preferably from about 0.001:1 to about 0.9:1, more preferably from about 0.002 to about 0.7:1, and most preferably from about 0.005:1 to about 0.5:1); the metal layers are dissimilar in metal (e.g., one of the metal layers is substantially a ferrous metal/alloy and the other metal layer is of a non-ferrous metal/alloy); a ratio of a thickness of the first metal layer to a thickness of the second metal layer is about 1:1 or more (preferably about 1.1:1 or more, more preferably about 1.2:1 or more, and most preferably about 1.4:1 or more) and/or about 5:1 or less (preferably about 4:1 or less, more preferably about 3:1 or less, and most preferably about 2.5:1 or less); the article has a stamped configuration; the polymeric coating has an epoxy functionality, a urethane functionality, or a silicon atom (e.g., a silane functionality); the polymeric core includes fibers in an amount of up to about 60 weight percent, based on the total weight of the polymeric core; the first metal layer has a face surface, wherein a major portion (e.g. about 90 percent or more) of an area of the face surface is free of the polymeric coating; the second metal layer has a face surface, wherein a major portion (e.g. about 90 percent or more) of an area of the face surface is free of the polymeric coating; a surface of the common edge and/or a face surface of one or both of the metal layers is covered (preferably plated) with one or more metallic covering layers (preferably one or more plating layers); the metallic covering layer(s) includes an iron phosphate; the metallic covering layer(s) includes at least one layer including a metal selected from nickel, chrome, copper, zinc, tin, aluminum, or any alloy thereof; the metallic covering layer(s) includes a plating of aluminum; the metallic coating layer(s) includes two or more layers of different metals; the laminate meets the requirements of no visible corrosion after 30 days corrosion testing according to SAE-J2334; the laminate meets the requirements of no visible corrosion after corrosion testing for 66 hours (preferably 200 hours) according to ASTM B368 CASS Test; one or more of the metal layers includes a steel, preferably a CRS, a stainless steel, or a HSLA); one or more of the metal layers includes aluminum, or an aluminum alloy including 60 atomic percent aluminum atoms, based on the total number of metal atoms in the aluminum alloy; the article includes a mechanical bond between the polymeric coating and the polymeric core; the polymeric core includes about 10 weight percent to about 90 weight percent (preferably about 50 weight percent to about 90 weight percent, more preferably about 60 weight percent to about 85 weight percent) metal fiber and/or metal particles; or the polymeric core includes a sufficient amount of metal fibers and/or metal particles so that the core layer is sufficiently conductive for applying a chrome edge treatment (preferably a uniform chrome edge layer) to an edge surface of the polymeric core.

The articles according to the teachings herein preferably includes a substrate component that is entirely sealed by multiple covering layers of different materials over different regions of the substrate component, wherein the multiple covering layers includes a plating layer of a metal and a polymeric coating layer (preferably including a polar polymer as a majority component).

Another aspect is directed at a method of making an article according to the teachings herein including two or more covering steps including a first and second covering steps for covering different surfaces or different regions of a substrate component (preferably, the article is sealed on one, two, three, four, or more surfaces (e.g., all surfaces) by the two or more covering steps.

Another aspect according to the teachings herein is directed at a method for preparing an article comprising the steps of: providing a laminate including a polymeric core layer (preferably including a non-polar polymer) between metal layers and having the common edge; and applying a polymeric coating (preferably including a polar polymer as a majority component) to the common edge.

This aspect may be further characterized by one or any combination of the following: the polymeric coating is applied as a liquid coating material having a sufficiently low viscosity at application conditions that allows it to be dispensed through a nozzle, onto the common edge; the method includes filling gaps present at the common edge (preferably with the liquid coating material); the method includes curing and/or hardening the liquid coating material (preferably in a period of about 15 minutes or less, more preferably about 2 minutes from a time of application); the polymeric coating is sufficiently cured and/or hardened so that it is dry to touch and/or retains a shape in the absence of an external pressure; the liquid coating material forms a durable direct or indirect bond to one or more, two or more, or each of the first metal layer, second metal layer, and the polymer core; the polymeric coating is robotically applied; the method includes a step of inspecting the coating to ensure coverage; the polymeric coating is cured or hardened at a temperature of about 20° C. or more (e.g., about 25° C. to about 125° C.); the polymeric coating is bonded to the common edge in a process that is free of heating the polymeric coating above about 150° C. (preferably the process of bonding is maintained below about 100° C., more preferably at or below 60° C.) and/or at a temperature of about room temperature or above; any hardening and/or curing is generally free of radiation stimuli, generally free of moisture stimuli, or both; the method includes UV curing the polymeric coating; the method includes coating a portion of a face surface of one or both of the metal layers with the polymeric coating; or the method includes a step of plating the laminate (preferably prior to applying the polymeric coating).

Another aspect is directed at an automotive component (e.g., a firewall, a dash panel, a door panel, a floor, a window trim, a door handle, a bumper, a roof, a hood, or a wheel well) including an article according to the teachings herein. Preferably the automotive component has an exterior surface.

Another aspect is directed at a method of manufacturing a component including a step of stamping an article and/or a substrate component according to the teachings herein (prior to or after applying a polymeric coating).

Another aspect is directed at a method of manufacturing an article comprising the steps of: providing a laminate including first and second metal layers and a polymeric core interposed between the two metal layers; stamping the laminate; plating the laminate with a metallic plating layer, including partially plating a common edge; and covering the remainder of the common edge with a polymeric coating after plating the laminate.

Another aspect according to the teachings herein is direct at a method of forming a covered article comprising the steps of: providing a bare article (i.e., a substrate component) having a first metallic face surface and an opposing second metallic face surface, and having an edge surface; covering the first metallic face surface with a polymeric over layer (preferably a layer of an anti-corrosion polymeric material); plating the second metallic face surface with one or more metallic plating layers (preferably a nickel plating or a chrome plating), wherein the covered article has a bare surface between the plated surface and the surface covered with the anti-corrosion polymeric material, wherein the bare surface is generally free of the anti-corrosion polymeric material and is either free of the plating or includes only partial plating; and iv) coating the bare surface with one or more polymeric coating layers (preferably including a primer material).

This aspect of the invention may be further characterized by one or any combination of the following: the bare article is a monolithic metal article; the bare article includes a light weight composite including metal layers and a polymeric core layer having metal particles and/or metal fibers (e.g., the edge surface includes an edge surface of the metal layers and an edge surface of the polymeric core layer); the polymeric core layer is interposed between the metal layers; the bare surface (e.g., after the steps of covering and plating and prior to the step of coating with the one or more polymeric coating layers (e.g., including a primer) includes an edge of the light weight composite including the polymeric core layer; the polymeric core layer includes a non-polar polymer and the polymeric coating layer includes a polar polymer; the polymeric core layer includes a sufficient amount of the metal fiber and/or metal particles for partial adhesion of the plating (e.g., chrome plating) to the edge surface of the polymeric core layer; the thickness of the layer of the anti-corrosion polymeric material is about 1 mm or less (preferably about 0.5 mm or less, and most preferably about 0.3 mm or less); the step of coating the first metallic face surface is before the step of plating the second metallic face surface; three or more, four or more, or substantially all of the surfaces of the bare article are covered (e.g. by any combination of the anti-corrosion polymeric material, the metallic plating layer, or the polymeric coating); or the first metal layer has a thickness less than the thickness of the second metal layer.

Another aspect is directed at a method comprising a step of covering a first face surface of a composite material with an anti-corrosion layer; wherein the composite material includes a first metal layer, a second metal layer, and a polymeric core layer between the first and second metal layers, wherein the polymeric core layer includes a non-polar polymer, and metal particles or metal fibers, wherein the composite material includes the first face surface, an opposing second face surface, and an exposed edge surface of the polymeric core layer; plating at least a second face surface of the composite material with one or more metal containing plating layers (preferably a nickel plating or a chrome plating); and coating an edge surface (e.g., the exposed surface) of the polymeric core layer with a polymeric coating including a polar polymer.

Another aspect is directed at a method comprising the steps of: forming a composite material including a first layer metallic layer, a second metallic layer, and a polymeric core layer interposed between the metallic layers, the polymeric core layers having an exposed edge surface and including metal fibers and/or metal particles; partially plating or entirely plating (preferably partially plating) the edge surface of the polymeric core layer with one or more metal layers (preferably a chrome layer or a nickel layer); and coating the plated edge surface with a polymeric coating.

These aspects may be further characterized by one or any combination of the following: the edge surface of the polymeric core layer is at least partially plated by the plating; the polymeric core layer includes a sufficient amount of the metallic fiber and/or the metallic particles so that the metallic plating layer at least partially adheres directly to the exposed edge surface of the polymeric core layer; the composite material is substantially entirely encased (e.g., on two or more sides, or four or more sides, or preferably entirely encased) by the covering layer(s) and plating layer(s); or the first metallic layer has a thickness less than the thickness of the second metallic layer.

Another aspect is directed at a coated article prepared by a method according to the teachings herein.

Another aspect of the teachings herein is directed at an adhesive coating material for covering an edge of a polymeric core layer, for covering a portion of a metallic cover layer, or both; wherein the adhesive coating material is a generally clear material, and the adhesive coating material includes a tracer component (preferably distributed throughout the material). Preferably the tracer component is observable under UV light. Preferably, the tracer component is not visible under visible light. The adhesive coating material may be employed as a polymeric covering layer, such as a polymeric covering layer described herein.

Another aspect of the teachings herein is directed at a quality control method for evaluating the quality of a layer, such as a clear or color-matched polymeric layer. The quality control method may include a step of detecting the presence of a tracer compound. Preferably the tracer compound is a UV tracer and the method includes applying a UV light source to a surface (e.g., a surface of a coating layer). The method may be a qualitative method, a semi-quantitative method, or a quantitative method. Preferably the method is capable of determining a thickness and/or a width of a layer including the tracer compound.

Another aspect according to the teachings herein is directed at a sealed composite material including a composite material having a polymeric layer sandwiched between two metallic layers, a common edge including an edge of the polymeric layer and an edge of the two metallic layers, wherein the common edge is at least partially coated with a polymeric covering layer including a tracer compound. The polymeric covering layer preferably is an adhesive coating material. The tracer compound preferably is a UV light tracer compound.

Another aspect of the invention is a method for producing an article comprising the steps of sealing an edge of a composite material with a generally clear adhesive coating material; and confirming the presence of the adhesive coating material along the edge. The composite material preferably is a sandwich composite according to the teachings herein, and the edge is preferably a common edge including an edge of a polymeric layer and edges of metallic layers. The step of confirming the presence of the adhesive coating material preferably includes a step of detecting the presence of a tracer material. The method preferably includes detecting a thickness of the coating and/or a width of the coating (i.e., the clear adhesive coating material).

BRIEF DESCRIPTION OF DRAWINGS

FIGS. 7A, 7B, 7C, and 7D are illustrative cross-sections at various steps in covering a laminate substrate component.

FIG. 7E is a variation of FIG. 7D. As illustrated in FIG. 7E, an anti-corrosion polymeric covering layer may partially cover only one of the face surfaces without covering an edge surface of the metallic layer. As illustrated in FIG. 7E, a polymeric coating layer may extend onto a face surface of a metallic layer.

FIG. 8E is a variation of FIG. 8D showing that one or both face layers may have bare regions prior to the final covering (e.g., with a polymeric primer or other polymeric coating).

DETAILED DESCRIPTION

Figure 1:
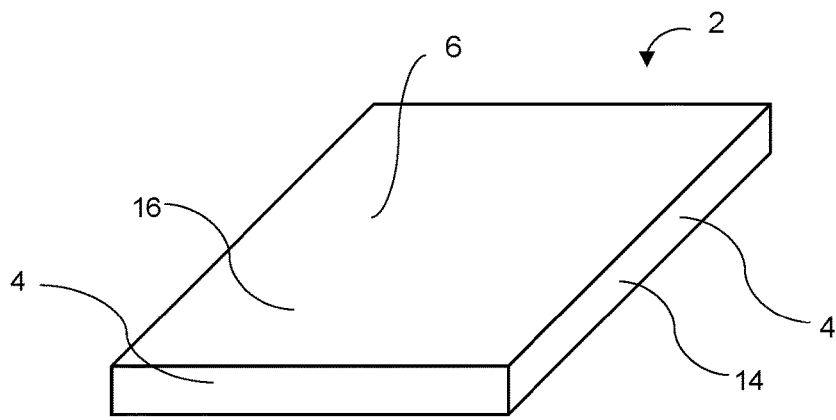
FIG. 1 is a perspective view of an illustrative article that is covered on the edge surfaces and the face surface. The article preferably is sealed by two or more covering layers of different materials.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein generally relate to materials having one or more covering layers and to methods for applying the one or more covering layer. The material generally includes a substrate component which includes, consists substantially of, or consists entirely of a metal or metal alloy.

The teachings herein describe new methods for covering the substrate component resulting in new structures having one or more of the surfaces (preferably all of the surfaces) of the substrate component protected by the covering layer(s).

By employing multiple covering layers, it is possible to achieve improved processes and/or improved structures. For example, the articles according to the teachings herein preferably include surfaces or surface regions having different covering layers (e.g., two or more of an anti-corrosion polymeric over layer, a metallic coating layer, or a polymeric coating).

Substrate

The articles according to the teachings herein include a substrate component (i.e., a substrate material). The substrate component may be a monolithic material or may be a composite material. The substrate component generally includes one or more metal layers. The substrate component preferably has opposing face surfaces (outer surfaces) that are metallic. The opposing metal face surface may be formed of the same metallic material or of different metallic materials. As one example, the substrate component may be formed of a monolithic metallic material. As another example, the substrate component may be formed from a composite material including spaced apart metal layers including a first metal layer having a first outer face surface and a second metal layer having an opposing second outer face surface.

The substrate component preferably provides strength and/or rigidity to the article.

The substrate component may be a component that is capable of being welded to other metallic components.

The substrate component may be in the form of a sheet or formed from a sheet of the substrate material. The thickness of the sheet of the substrate material preferably is sufficient large for providing strength and/or rigidity to the article. The thickness of the substrate material preferably is sufficiently small so that the sheet can be formed (e.g., in a stamping or other forming process) and/or so that the weight and/or cost of the article is reduced or minimized (e.g., while maintaining performance requirements). Preferably the substrate component has a thickness of about 0.3 mm or more, more preferably about 0.4 mm or more, even more preferably about 0.6 mm or more and most preferably about 0.8 mm or more. Preferably the substrate component has a thickness of about 6 mm or less, more preferably about 4 mm or less, even more preferably about 3 mm or less, and most preferably about 2 mm or less.

The substrate component may be a sheet or formed from a sheet of a monolithic metallic material.

The substrate component may be a sheet of a composite material or formed from a sheet of a composite material. For example, the composite material (i.e., laminate) may include a first metallic layer, a second metallic layer, and polymeric core layer interposed between the first and second metallic layers. Preferably, the composite materials consist essentially of the first metallic layer, the second metallic layer and the polymeric core layer. For example, the total volume of the first metallic layer, the second metallic layer and the polymeric core layer may be about 85% or more, about 90% or more, about 95% or more, about 98% or more, or about 100%, based on the total volume of the substrate component. The volume of voids in the substrate component preferably is about 15% or less, about 10% or less, about 5% or less, about 2% or less, or about 0%, based on the total volume of the substrate component.

The composite material preferably includes the first metallic layer, the second metallic layer and the polymeric core layer joined together to define a laminate. The polymeric core layer may be joined directly or indirectly to the metallic layers. The composite material generally has a common edge shared by the first metallic layers, the second metallic layer and the polymeric core layer.

The metallic materials of the laminate (e.g., of the first metallic layer, the second metallic layer, or the monolithic metallic material) may be any metal or metal alloy that is a solid at 350° C. Preferably the metal or metal alloy has one or any combination of the following features: i) a melting temperature (as measured for example by differential scanning calorimetry) of about 400° C. or more (preferably about 600° C. or more), or ii) a yield strength (in tensile, as measured according to ASTM E8-16a, at a temperature of about 23° C.) of about 100 MPa or more, preferably about 150 MPa or more, and more preferably about 200 MPa or more; or iii) a tensile strain at fracture (as measured according to ASTM E8-16a, at a temperature of about 23° C.) of about 3% or more, preferably about 7% or more, even more preferably about 15% or more, even more preferably about 25% or more, and most preferably about 35% or more). Particularly preferred metals and metal alloys include steel, aluminum, and aluminum alloys. Preferred steel materials include cold rolled steel, stainless steel and high-strength low-alloy steel (i.e., HSLA, preferably having a carbon content between about 0.05 to about 0.25%, and including up to about 2.5% other alloying elements). Preferred aluminum containing materials include aluminum and aluminum alloys including 60 atomic percent or more aluminum atoms, based on the total number of aluminum atoms in the alloy. The metallic layers of the laminate may be formed of the same metal(s) or may be formed of different metal(s). For example, both metal layers may be a ferrous metal, one layer may be a ferrous metal and the other a non-ferrous metal, or both may be a non-ferrous metal. In various applications (such as when one of the metal layers will be more visible than the other metal layer, or when the metal layers will be exposed to different environmental and/or mechanical exposures), there may be cost and/or performance benefits for using dissimilar metals.

The metal layers of the laminate may have an average thickness that is the same or different. Preferably each metal layer has a thickness that is generally uniform. When the laminate is formed (e.g., by stamping or other forming processes), regions that are drawn may have a different thickness than regions that are not drawn. The ratio of the average thickness of the first metal layer to the average thickness of the second metal layer may be about 1:1 or more, about 1.1:1 or more, about 1.2:1, or about 1.4:1 or more. The ratio of the average thickness of the first metal layer to the average thickness of the second metal layer may be about 5:1 or less, about 4:1 or less, about 3:1 or less, or about 2.5:1 or less.

The polymeric core layer includes or consists essentially of one or more polymers. The polymeric core layer may be substantially free of metallic materials (e.g., metallic particles and/or metallic fibers). For example, the volume of any metallic material in polymeric core layer may be less than 3 volume percent, less than about 2 percent, less than about 1 percent, or about 0 percent, based on the total volume of the polymeric core layer. As used herein, metallic particles may be defined by a longest dimension of about 2 mm or less and an aspect ratio of the longest dimension to the second longest dimension (e.g., length to width ratio) that is less than an aspect ratio of the second longest dimension to the shortest dimension (e.g., width to thickness ratio). As used herein, metallic fibers may be defined by a ratio of the longest dimension to the second longest dimension that is greater than an aspect ratio of the second longest dimension to the shortest dimension. Preferred metallic fibers have a length to width ratio of about 10:1 or more, about 15:1 or more, or about 20:1 or more; and/or a weight average length of about 1 mm or more, about 2 mm or more, or about 3 mm or more. Preferred metallic fibers have a length to width ratio of about 200:1 or less, about 100:1 or less, or about 75:1 or less. The polymeric core layer may include or consist essentially of a filled polymeric material including metallic fibers and/or metallic particles dispersed in the one or more polymers. The concentration of metallic particles and/or metallic fibers in the filled polymeric material preferably is sufficiently high so that an adhesion promoting layer, a plating layer, or a polymeric coating at least partially adheres to a surface of the filled polymer material. The total amount of any metallic particles and metallic fibers in the filled polymeric material preferably is more than about 3 weight percent, about 5 volume percent or more, about 7 volume percent or more, or about 8 volume percent or more, based on the total volume of the filled polymeric material. The total amount of the metallic particles and metallic fibers should be sufficiently low so that the filled polymeric material can be processed to form the core layer (e.g., by a process that includes extruding, rolling/calandering, or molding the filled polymeric material). Preferably, the total amount of the metallic particles and metallic fibers is about 95 weight percent or less, more preferably about 85 weight percent or less, and most preferably about 80 weight percent or less, based on the total weight of the filled polymeric material. Preferably the total amount of the metallic fibers and metallic particles is about 20 weight percent or more, more preferably about 50 weight percent or more and most preferably about 60 weight percent or more, based on the total weight of the filled polymeric material.

Application of one or more of the coating layers may be facilitated and/or improved (e.g., more uniform) by a polymeric core layer that is electrically conductive (e.g., can carry a current along the surface and/or through the bulk of the core layer). Here, it may be desirable for the polymeric core layer to include a sufficient amount of metallic fibers and/or metallic particles so that the polymeric core layer is electrically conductive. This may be particularly useful when applying a chrome edge treatment to an edge surface of the polymeric core layer. The use of the metallic particles or metallic fibers in the polymeric core layer results in a more uniform chrome layer and/or a chrome layer having a higher cover of the edge surface of the polymeric core layer.

Figure 3:
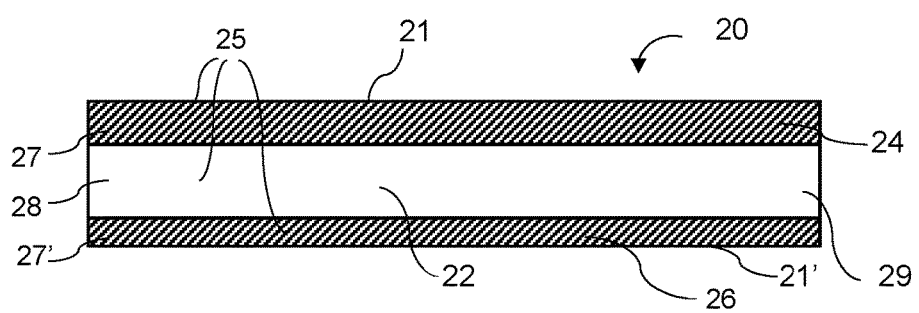
FIG. 3 is a side view of a substrate component (e.g., a laminate material) including a polymeric core layer interposed between two metallic layers. The polymeric core and the metallic layers share a common edge surface.

With reference to FIG. 3 (showing a front view of a composite material), the composite material may include a first metallic layer 24, a second metallic layer 26, and a polymeric core layer 22 interposed between the first and second metallic layers 24, 26. The composite material may have a metallic first face surface 6 and an opposing metallic second face surface 7. The polymeric core layer, the first metallic layer, and the second metallic layer may have a common edge surface 25 (including an edge surface of the two metallic layers 27, 27' and an edge surface of the polymeric core layer 28).

The polymeric core layer includes one or more polymers. The one or more polymers may preferably includes, consist essentially of, or consists entirely of one or more thermoplastic polymers. Preferred thermoplastic polymers are non-polar thermoplastic polymers. Non-polar thermoplastic polymers preferably are a major component of the one or more polymers. For example, the amount of the non-polar thermoplastic polymers in the polymeric core layer may be about 55 weight percent or more, about 70 weight percent or more, about 83 weight percent or more, about 92 weight percent or more, about 95 weight percent or more, or about 100 weight percent, based on the total weigh of the polymers in the polymers in the polymeric core layer.

The non-polar thermoplastic polymers may be polyolefin homopolymers and/or polyolefin copolymers including one or more olefin monomers. The concentration of the olefin monomers in the polyolefin copolymer preferably is about 90 weight percent or more, more preferably about 95 weight percent or more, even more preferably about 98 weight percent or more, and most preferably about 99 weight percent or more, based on the total weight of the polyolefin copolymer.

Adhesion Promoting Layer

The article may include an adhesion promoting layer for improving the joining of a polymeric coating (e.g., including a polar polymer) to an edge surface of a polymeric core layer (e.g., having a non-polar polymer as a majority component) of a substrate component. At least a portion of the adhesion promoting layer is between the edge surface of the polymeric core layer and the polymeric coating. Preferably, the adhesion promoting layer is in direct contact with the polymeric core layer or the polymeric coating, and more preferably is in direct contact with both the polymeric core layer and the polymeric coating. The adhesion promoting layer may partially cover or entirely cover the edge surface of the polymeric core layer. Surprisingly, it has been observed that a partial covering of the edge surface with the adhesion promoting layer may be sufficient for joining the polymeric coating to the polymeric core layer. The area of the edge surface of the polymeric core layer that is covered by the adhesion promoting layer preferably is about 20% or more, more preferably about 40% or more, even more preferably about 55% or more, and most preferably about 80% or more. The area of the edge surface of the polymeric core layer that is covered by the adhesion promoting layer (i.e., the surface coverage) may be about 100% or less, about 95% or less, about 90% or less, or about 85% or less.

The adhesion promoting layer preferably includes one or more metals. Preferably, the adhesion promoting layer is a non-polymeric layer. For example, the adhesion promoting layer may be a plating layer such as described herein. Preferred metal plating layers for the adhesion promoting layer include a chrome layer, or a nickel layer. It will be appreciated that the adhesion promoting layer may include one or more plating layers. If multiple plating layers are employed, they may be the same or may differ with respect to one or more characteristic (e.g., thickness, surface coverage, metal). Preferably, the polymeric core layer includes metal particles and/or metal fibers for improving the adhesion between the polymeric core layer and the adhesion promoting layer and/or for improving surface coverage of the edge surface of the polymeric core layer with the adhesion promoting layer.

Metallic Coating Layer (e.g., Plating Layer)

One or more of the surfaces of the substrate component preferably is coated with one or more metallic coating layers. The metallic coating layer(s) may act as an adhesion promoting layer (e.g., for joining a polymeric coating layer including a polar polymer to a polymeric core layer having a non-polar polymer). The metallic coating layer may cover some or all of the edge surface of the substrate component (e.g., some or all of the common edge surface of the laminate). The metallic coating layer may cover one or both of the face surfaces of the substrate component. For example, the outward facing surfaces of the first and/or second metallic layers may be partially or entirely covered by the metallic coating layer. The metallic coating layer(s) may include a coating of a ferrous metal, a coating of a non-ferrous metal, or both. The metallic coating layer(s) may include at least one layer including a metal or metal alloy comprising nickel, chromium (e.g., a chrome plating), copper, zinc, tin, aluminum, or any combination thereof. The metallic coating layer(s) may include a layer including or consisting essentially of an iron phosphate. The metallic coating layers may include two or more layers of different materials. The metallic coating layer may be selected for purposes of aesthetics, adhesion to the substrate component, corrosion resistance, or any combination thereof.

Polymeric Coating

The article according to the teachings herein preferably includes one or more polymeric coatings. The polymeric coating preferably covers at least a portion of the edge surface of the substrate component. The polymeric coating may cover at least a portion of a common edge shared by a first metal layer, a second metal layer, and a polymeric core of a laminate. Preferably, the polymeric coating covers at least the edge surface of the polymeric core. The polymeric coating may be in direct contact with at least a portion of the substrate component. The article may include one or more additional layers between the polymeric coating and some or all of the common edge. For example, the article may include a partial or complete plating layer between the polymeric core and the polymeric coating, such as described herein.

A portion (i.e., a section or region) of the polymeric coating may overlay an edge surface of the first metal layer, the second metal layer, or the polymeric core layer. Preferably, the polymeric coating overlays an edge surface of the polymeric core layer and both the first and second metal layers of the laminate. The polymeric coating may be provided for protecting one or more surfaces (e.g., one or more edge surfaces) of the laminate and should have a sufficient thickness for preventing damage (e.g., from impact, environmental exposure, or thermal exposure) to the substrate component. The average thickness of the regions of the polymeric coating overlaying the edge surfaces of the first metal layer, the second metal layer, the polymeric core layer, or any combination preferably is about 0.001 mm or more, more preferably about 0.002 mm or more, even more preferably about 0.005 mm or more, even more preferably about 0.010 mm or more, and most preferably about 0.2 mm or more. The thickness of the polymeric coating may be sufficiently low so that costs and/or weight is reduced or minimized. The average thickness of the polymeric coating in these regions preferably is about 0.8 mm or less, more preferably about 0.5 mm or less, even more preferably about 1 mm or less, and most preferably about 0.05 mm or less. The polymeric coating may have a thickness that is generally uniform, or the polymeric coating may have a thickness that is nonuniform. For example, an average thickness of the polymeric coating over an edge surface of the polymeric core layer may be different from an average thickness of the polymeric coating over an edge surface of one or both metal layers. The ratio of the average thickness of the polymeric coating (i.e., in a direction normal to the common edge) to the thickness of the substrate component (e.g., the laminate), in a direction normal to a face surface of the metal layer of the substrate component, preferably is about 0.001:1 or more, about 0.002:1 or more, about 0.005:1 or more, or about 0.010 or more and/or about 0.9:1 or less, about 0.7:1 or less, or about 0.5:1 or less. For example, the ratio of the average thickness of the polymeric coating to the thickness of the substrate component may be from about 0.001:1 to about 0.9:1, from about 0.001 to about 0.5, from about 0.002 to about 0.7:1, or from about 0.005:1 to about 0.5:1.

The polymeric coating may be a cross-linked polymeric coating.

The polymeric coating preferably includes or consists essentially of one or more monomers or functional groups including oxygen, nitrogen, sulfur, halogen, or silicon atoms. The polymeric coating preferably includes one or more polar polymers. The polymeric coating may include one or more multifunctional monomers (e.g., having a functionality of 3 or more) for cross-linking or otherwise forming a network structure.

In some applications, it is necessary for the polymeric coating to be located essentially only at the edge surface of the substrate component (e.g., only the common edge surface of the laminate). Here, it is desirable that a substantial portion of the face surfaces of the substrate component preferably are not covered by the polymeric coating. The area of the face surfaces (e.g., the first face surface and/or the second face surface) of the substrate component that is covered by polymeric coating is preferably about 30 percent or less, more preferably about 20 percent or less, even more preferably about 10 percent or less, and most preferably about 5 percent or less, based on the total area of the face surface(s). The area of the face surface(s) of the substrate component that is covered by the polymeric coating may be about 0 percent or more.

The polymeric coating may be attached to the polymeric core layer using a chemical bond or a mechanical attachment. Chemical bonds include any type of bond that relies on a chemical reaction or a chemical attraction, such as covalent bonds, Van der Waal forces, hydrogen bonding, and ionic bonding. The chemical bond may be a direct bond or may be a bond to one or more adhesion promoting layers. A mechanical attachment may be any feature(s) other than chemical bonds that can transfer a tensile force from the polymeric core layer to the polymeric coating.

Anti-Corrosion Covering Layer

The article may include an anti-corrosion covering layer, preferably on one of the face surfaces of the substrate component. The anti-corrosion covering layer, if employed, is preferably applied prior to the application of the metallic coating layer(s) (e.g., prior to the application of the metallic plating layers). The anti-corrosion covering preferably is applied to a surface that is not a show surface.

The anti-corrosion covering preferably is a polymeric material. The anti-corrosion coating may be a material that is generally an electrical insulator. By applying the anti-corrosion covering layer prior to applying a metallic layer, it is possible to apply the anti-corrosion covering in a more uniform manner. For example, the anti-corrosion covering may be applied using a coater device or other device that can spread the material uniformly on a surface or a region of a surface. As another example, the anti-corrosion covering may be applied as a polymeric film or polymeric sheet. The variation in the thickness of the anti-corrosion coating may be characterized by an average surface roughness, $R_A$, of about 200 µm or less, preferably about 50 µm or less, more preferably about 20 µm or less, and most preferably about 10 µm or less (as measured for example according to ASTM B946-06). The anti-corrosion covering preferably adheres to the metal surface (i.e., of the substrate component) to which it is being applied.

After applying the anti-corrosion covering to the substrate component, there are surfaces that are not coated. One or more of these surface (for example a face surface that preferably is a show surface) may be coated using a plating step to form a metallic coating. The plating step preferably is an electroplating step. Because of the insulating characteristics of the anti-corrosion covering, the plating typically does not cover the anti-corrosion coating and also does not cover a region of the substrate component surface adjacent to the anti-corrosion covering (e.g., a region that frames the anti-corrosion covering). It will be appreciated that there may be multiple plating steps. After the plating step(s), there will typically be a bare region of the surface of the substrate component. This bare region may then be protected by covering it with a polymeric coating (preferably including a non-polar polymer). The polymeric coating may also cover over a portion of the anti-corrosion covering adjacent to the bare region and/or a portion of the metallic coating (e.g., metallic plating) adjacent to the bare region. The polymeric coating, along with the anti-corrosion covering layer and the plating layer may entirely seal the edge surface and the adjacent regions of the face surfaces of the substrate component. The polymeric coating, along with the anti-corrosion covering layer and the plating layer may entirely seal the substrate component.

The articles according to the teachings herein may have a generally sheet-like configuration (e.g., having orthogonal length, width and thickness directions). The articles according to the teachings herein may be formed using a process that plastically deforms the substrate component. For example, the article may have a stamped configuration (or other formed configuration).

The polymeric coating material (e.g., the edge sealer) preferably has excellent metal bonding. The polymeric coating material may have generally poor adhesion to the polymer of the polymeric core layer. However, by employing a polymeric core having conductive material in the polymer, strong adhesion between the sealer and the core layer may be obtained. As an alternative, the conductive material may allow for the edge surface of the core layer to be plated or otherwise coated with a metal coating layer (preferably nickel and/or chrome plating), so that the edge sealer can adhere to the metal coating layer. The edge sealer may be a primer. When a polymer core is employed without conductive material, the polymeric coating layer easily peels off of the core layer. However, the structures including the conductive material in the core layer have significantly improved adhesion between the polymeric coating material and the core layer.

Preferred non-polar polymers are characterized by a contact angle of water of about 80° or more, more preferably about 85° or more, even more preferably about 90° or more, and most preferably about 94° or more, as measured according to ASTM D7334-08 (2013). Preferably the contact angle of octane in contact with the non-polar polymer is about 60° or less, more preferably about 40° or less, even more preferably about 20°, and most preferably about 10° or less.

Preferred polar polymer are characterized by a contact angle of octane of about 75° or more, more preferably about 85° or more, even more preferably about 90° or more, and most preferably about 94° or more, as measured according to ASTM D7334-08 (2013). Preferably the contact angle of water in contact with the polar polymer is about 70° or less, more preferably about 60° or less, even more preferably about 50°, and most preferably about 40° or less.

In various applications, it may be desirable for the polymeric coating material to be difficult to observe so that it does not significantly change the appearance of the part. For example, a polymeric coating material may be a generally clear material or color matched to a substrate or other another coating layer. In order to confirm the presence of the polymeric coating material, the material may include a tracer component (e.g., a tracer compound) that can be easily detected. The tracer component may be an organic material, an inorganic material, or an organometallic material. The tracer component should be present in an amount sufficient for detecting the presence of the polymeric coating material, such as by a quality control test. It will be appreciated that the amount of the tracer compound needed in the polymeric coating material may depend on the thickness of the covering to be made with the material. The tracer component preferably is present in an amount of about 0.001 weight percent or more, more preferably about 0.01 weight percent or more, even more preferably about 0.1 weight percent or more, and most preferably about 0.2 weight percent or more, based on the total weight of the polymeric coating material. The tracer component preferably is present in an amount sufficiently low, so that it is generally not visible by an individual. Preferably, the concentration of the tracer compound in the polymeric coating material is sufficiently low so that the coating does not change the appearance of a metal when the coating is applied (e.g., a metal having a chrome color, a natural color, or any other color). The tracer component preferably is present in an amount of about 20 weight percent or less, more preferably about 5 weight percent or less, even more preferably about 2 weight percent or less, even more preferably about 1 weight percent or less, and most preferably about 0.5 weight percent or less, based on the total weigh of the polymeric coating material. The tracer component preferably is distributed throughout the polymeric coating material. The tracer component may include a dye. The tracer component may be a UV tracer. The UV tracer component may have a relatively high absorbance of UV light (e.g., relative to a surface directly below a layer of the polymeric coating material. The polymeric coating material may be an adhesive coating material having good adhesion to a metal, to a polymeric core layer of a composite material (e.g., an unfilled or a filled polymeric material according to the teachings herein), or both. The tracer component preferably is selected so that it does not substantially interfere with the adhesion (e.g., as measured by adhesive strength or a cohesive failure mechanism in a lap shear test) of the polymeric coating material. The polymeric coating material may be a material that cures or cross-links (e.g., at room temperature or at an elevated temperature). The tracer component preferably is selected so that it does not substantially interfere with the curing of the polymeric coating material. The tracer component may include, consist essentially of, or consist entirely of one or more fluorophores, one or more chromophores, or both. Preferably the tracer component includes one or more fluorophores. The tracer component may include compounds for amplifying a signal. For example, the tracer component may include a fluorophore, and the signal may be amplified by an additional compound which may also be a different fluorophore. The tracer component may be a compound containing a plurality of aromatic groups. The tracer compound may be a fluorescent chemical compound that can re-emit light upon light excitation. The tracer compound may be bonded to a polymer or prepolymer. Any fluorophore that can be detected using a detection device and differentiated from other compounds in the part (i.e., can show the presence and/or amount of the coating) may be employed. Without limitation, examples of fluorophores that may be employed include fluorescein, fluorescein derivatives (e.g., fluorescein isothiocyanate, carboxyfluoroscein, . . . ), rhodamine, rhodamine derivatives, cyanine, derivatives of cyanine, coumarin, and derivatives of coumarin. Other examples of fluorophores are described in Fluorophores Guide, PROMEGA (https://www.promega.com/-/media/files/resources/ . . . /fluorophoresguidepdf.pdf?la=en, as accessed on Apr. 27, 2018). The tracer component may be excited by light of a first wavelength and emit light at a different wavelength. For example, the tracer component may be excited by UV light and emit visible light. As another example, the tracer component may emit UV light. Preferably the tracer component only emits UV light. The polymeric coating material preferably is capable of being applied as a uniform layer. The thickness variation preferably is about 25 percent or less, about 10 percent or less, about 5 percent or less, or about 3 percent or less. The tracer component preferably is selected so that it does not substantially interfere with the ability to form a uniform layer. The tracer component preferably has an absorbance in the range of about 300 nm or more (preferably about 340 nm or more, more preferably about 365 nm or more, and even more preferably about 370 nm or more) to about 450 nm or less (preferably about 425 nm or less, more preferably about 395 nm or less, and most preferably about 390 nm or less). The tracer component preferably is selected so that it is substantially inert to the polymeric coating material (e.g., prior to applying as a coating, after applying as a coating, after curing, or any combination thereof). The polymeric coating material may include any polymer described herein for a coating or covering layer or any precursor to such polymer. The polymeric coating material preferably includes a monomer, a prepolymer, or a polymer capable of cross-linking (e.g., curing). For example, the polymeric coating material may be a thermoset resin. The polymeric coating material may include a curable component (monomeric, prepolymer or polymer) and a cross-linking agent or hardener capable of reacting with curable component to form a network structure. The curable component preferably includes epoxide functional groups. The curable component may cure by forming urea groups. The curable component may include an acrylic, an acrylate, an epoxide, a polyol, or any combination thereof.

The polymeric coating material may be used in a sealed composite material. The sealed composite material may include a sandwiched composite material including a polymeric layer sandwiched between two metallic layers and a common edge including an edge of the polymeric layer and an edge of the two metallic layers. The common edge preferably is partially or completely sealed by a layer (e.g., coating layer) of the polymeric coating material. The polymeric coating material preferably includes a tracer compound according to the teachings herein. The adhesive coating material may cover at least a portion of a face surface of one or both of the metallic layers. The sealed composite material may be shaped as an automotive component, such as a panel, a roof, a floor, a compartment, or a bumper.

The sealed material (e.g., the sealed composite material) may be tested for quality to ensure that the surface (e.g., the edge surface) is sufficiently covered.

Corrosion Resistance

The one or more covering layers preferably improve the corrosion resistance of the substrate component (e.g., of the laminate). Preferably, the article is characterized by one or any of the following: i) the article (e.g., the laminate including one or more covering layers) meets the requirements of no visible corrosion after 30 days corrosion testing according to SAE-J2334; or ii) the article meets the requirements of no visible corrosion after corrosion testing for 66 hours (preferably 200 hours) according to ASTM B368 CASS Test.

Method

The articles according to the teachings herein may be prepared by a method including a step of applying a polymeric coating (e.g., a polymeric coating including a polar polymer) over a common edge surface of a substrate component (e.g., a laminate having a polymeric core layer between two metallic layers). The polymeric coating may be applied as a liquid coating material. Preferably the liquid coating material has a sufficiently low viscosity at application conditions so that it can be dispensed through a nozzles over the common edge.

The common edge may have gaps (e.g., valleys, holes, channels, or other surface irregularities), or the common edge may have a flat, uniform surface. The gaps, if present, may be in the polymeric core layer, in the metallic layer, or both. Preferably the liquid coating material fills in some or all of the gaps on the common edge.

The method may include one or more steps of curing or hardening the liquid coating material. The curing or hardening may be at an ambient temperature of about 10° C. to about 35° C., or may be at an elevated temperature of more than 35° C. Preferably the hardening or curing is at a temperature of about 20° C. or more, more preferably at a temperature from about 25° C. to about 125° C. Preferably, the curing time (e.g., the time for the liquid coating material to set) preferably is about 15 minutes or less, more preferably about 8 minutes or less, and most preferably about 2 minutes or less (e.g., from a time of application of the liquid coating material. Preferably the curing or hardening of the liquid coating material is sufficient so that it is dry to touch and/or retains a shape in the absence of an external pressure. After the curing or hardening of the liquid coating material, a polymeric coating layer is formed having a durable direct or indirect bond to one or more (or all) of the first metal layer, the second metal layer, and the polymeric core layer of the laminate. The polymeric coating layer may be applied as a polymeric material. For example, the polymeric material may be heated (e.g., above a melting temperature and/or above a glass transition temperature) so the material can easily be applied. As another example, the polymeric coating layer may be applied as a film or other solid form which is then heated after being positioned (e.g., over the edge surface of the substrate component). The polymeric coating layer preferably is applied using a nozzle or other coating device. Preferably, the polymeric coating layer is robotically applied. The process may include a step of inspecting the polymeric coating layer (e.g., prior to, or after the curing or hardening of the liquid coating material). For example, the polymeric coating layer may be inspected to ensure coverage over one or more surfaces of the substrate component, such as the coverage over the polymeric core layer of the laminate. Preferably the polymeric coating layer is bonded to the common edge of the laminate in a process s that is free of heating the polymeric coating above about 150° C. During the bonding of the polymeric coating layer to the common edge, the temperature is maintained at a temperature of about 125° C. or less, more preferably about 100° C. or less, and most preferably about 60° C. or less. During the bonding, the temperature preferably is about room temperature or above. The curing or hardening of the polymeric coating preferably results in a polymeric material that is cross-linked. The curing or hardening may employ light (e.g., infrared light or UV light) to accelerate the reaction. The polymeric coating may also be used to cover a portion of a face surface of one or both of the metallic layers of the substrate component.

The process may include a step of forming the substrate component prior to any steps of coating the substrate component or after one or more steps of coating the substrate component. For example, the step of forming may be after applying the polymeric coating layer over an edge surface of the substrate component. The forming step may include a step of stamping or other method of plastically deforming the substrate component.

The method may for making an article (e.g., an article according to the teachings herein having a substrate component that is a laminate) may include a step of providing a laminate having a polymeric core interposed between two metal layers, a step of stamping the laminate, a step of plating the laminate including plating a common edge of the laminate, and a step of covering the common edge with a polymeric coating after plating the laminate.

The method for sealing an edge of a sandwich composite material (including a polymeric layer sandwiched between two metallic layers having a common edge including an edge of the polymeric layer and an edge of the two metallic layers) preferably includes a step of at least partially coating the common edge with a polymeric coating material, and a step of confirming the presence of the polymeric coating material, particularly where the polymeric coating material is clear or color-matched. The polymeric coating material preferably includes a tracer component such as described herein. The polymeric coating material preferably is an adhesive coating material having good adhesion to the polymeric layer, to the metallic layer, or both. The method preferably includes detecting the tracer component. The detecting of the tracer component may be a continuous process where a detection device moves along the sealed edge of a part or the sealed edge moves along the detection device. During the step of confirming the presence of the polymeric coating material, the device and/or the part may move at a linear rate of about 1 mm/sec or more, preferably about 10 mm/sec or more, even more preferably about 100 mm/sec or more, even more preferably about 500 mm/sec or more, and most preferably about 2000 mm/sec or more. The detection device preferably is capable of evaluating parts (e.g., an automotive part, such as an automotive bumper) at a high rate, for example about 0.5 parts/min or more, about 2 parts/min or more, about 5 parts/min or more, about 10 parts/min or more, or about 30 parts/min or more. The detection device may include a single detector, a line of detectors, or an array of detectors. The detection device may include a camera or other detector (e.g., a UV camera, light detector) for measuring a light effect (e.g., UV light, visible light, or both) of a tracer component. The detection device preferably measures UV light in a range of about 365 nm to 395 nm. The detection device may employ light of a first wavelength for exciting a tracer component and employ a detector for detecting an emitted light characteristic of the tracer component (e.g., different from the first wavelength). The method may include a step of robotically moving or conveying an edge sealed composite material under the detector so that the detector can observe an entire coated edge. The method may include a step of robotically moving or conveying a detector over an edge sealed composite material so that the detector can observe an entire coated edge. The method may employ a processor for analyzing the measurements of the detector. For example, the process may confirm a tracer component and/or a thickness of the coating is above a predetermined threshold limit. As another example, the process may confirm that the width of the coating is sufficient. The method may include a controller for controlling the relative movement of the detector and the sealed edge. The method may include a step of moving an inadequately coated part to a reject location and/or informing an operator that the part is inadequately coated. The detection device may be employed at any time after the coating is applied. For example, the detection device may be positioned after a coating device (i.e., a device for applying the coating). The detection device may be at a fixed distance from the coating device and preferably the detection device is attached to the coating device and/or moves with the coating device. The detection device may be located separate from the coating device. For example, the detection device may be in a check station for checking parts after a coating procedure has been completed for the part.

Applications

The articles according to the teachings herein are particularly useful in applications in which the article is exposed to outdoor environment and/or road environments. For example, the article may be used in an automotive component. Preferred automotive components include a firewall, a dash panel, a door panel, a floor, a window trim, a door handle, a bumper, a roof, a hood, or a wheel well. Automotive components that are particularly benefited by features of the articles according to the teachings herein include automotive components having at least one exterior surface (e.g., a surface that may be exposed to heat, light, impact, rain, snow, salt, ambient temperature fluctuations, or any combination thereof).

Without being bound by theory, it is believed that the polymeric core layer of a sandwich composite and/or a polymeric coating layer may prevent complete coverage of a surface due to relatively low electrical conductivity and/or relatively low surface energy of these materials. By way of reference, materials having varying surface energies are listed below: Material having a surface energy of 150 mJ/m$^2$ or more include metals and ceramic materials. Examples of metals and ceramic materials having a surface energy of about 150 mJ/m$^2$ include copper (about 1103 mJ/m$^2$), aluminum (about 840 mJ/m$^2$), zinc (about 753 mJ/m$^2$), tin (about 526 mJ/m$^2$), lead (about mJ/m$^2$), steel (about 700-1100 mJ/m$^2$) and glass porcelain (about mJ/m$^2$). Materials having a surface energy of about 38 to about 100 mJ/m$^2$ include high surface energy plastics. Examples of high surface energy plastics includes acrylics (about 38 mJ/m$^2$), rigid polyvinylchloride (about 39 mJ/m$^2$), polycarbonate (about 42 mJ/m$^2$), ABS (i.e., acrylonitrile-butadiene-styrene) (about 42 mJ/m$^2$), polyurethane paint (about 43 mJ/m$^2$), epoxy paint (about 43 mJ/m$^2$), polyester (about 43 mJ/m$^2$), alkyd enamels (about 45 mJ/m$^2$), nylon (about 46 mJ/m$^2$), phenolic polymers (about 47 mJ/m$^2$), and KAPTON® polyimide films (about 50 mJ/m$^2$). Materials having a surface energy of 37 mJ/m$^2$ or less include low surface energy plastics. Examples of low surface energy plastics include polyvinyl alcohol (about 37 mJ/m$^2$), polyvinyl acetate (about 37 mJ/m$^2$), polystyrene (about 36 mJ/m$^2$), acetal (about 36 mJ/m$^2$), ethylene vinyl acetate copolymer (about 33 mJ/m$^2$), polyethylene (about 31 mJ/m$^2$), polypropylene (about 29 mJ/m$^2$), and fluoropolymers (about 18 mJ/m$^2$).

Corrosion Resistance

Unless stated otherwise, all corrosion resistance testing is performed according to ASTM B 368 (copper accelerated acetic acid salt spray) for an extended time of 130 hours.

A covered article may include a face surface that is covered, an edge surface that is covered, or preferably both. With reference to FIG. 1, a covered article 2 may have opposing face surfaces 6, 7. One or both of the face surfaces may have one or more coverings or platings 16. The covered article includes edge surfaces 4, Some or all of the edge surfaces 4 may have one or more coverings or platings 14. The covered article 2 has a substrate (not shown) which is covered. and is preferably completely covered. Preferably the covered article is sealed by two or more covering or plating layers of different materials.

Figure 2:
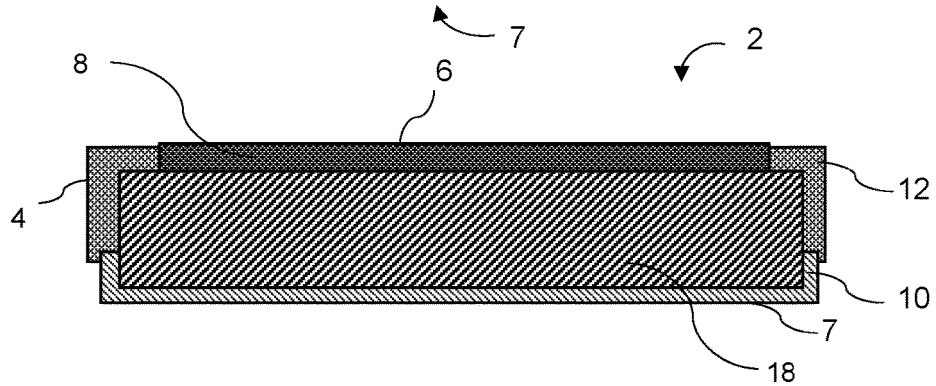
FIG. 2 is a cross-sectional view of an illustrative article including a substrate component covered by multiple covering layers including a first polymeric covering layer, a second polymeric covering layer, and a metallic covering layer.

A covered article may be covered by two or more different material, such as illustrated in FIG. 2. The covered article includes a substrate 18. One of the face surfaces 6 may have a covering of a first polymeric covering layer 8. The opposing face surface may be covered by a different material. For example, the opposing face surface 7 may be covered by a metallic covering layer 10. Preferably the metallic covering layer is a plating. More preferably, the metallic covering layer includes a chrome and/or a nickel plating. An edge surface may be covered by the first polymeric covering layer 8, by the metallic covering layer 10, by a different material, such as a second polymeric covering layer 12, or any combination thereof. Preferably the second polymeric covering layer includes a polymeric coating layer, such as a primer layer, a base coat layer, a top coat layer, or any combination thereof.

FIG. 3 is a side view of an illustrative substrate component 20 of a composite material. The composite material includes a polymeric core layer 22 interposed between a first metallic layer 24 and a second metallic layer 26. The metallic layers preferably include or consist of sheets of steel, sheets of aluminum, or sheets of other metallic material. The polymeric core layer 22 includes one or more polymers 29. The metallic layers 24, 26 may be formed of the same material or of different material. The metallic layers may have the same thickness, but preferably have different thicknesses. The substrate has opposing face surfaces 21, 21'. The faces surfaces preferably are metallic surfaces. The substrate has a common edge surface 25. The edge surface may be formed of materials having different properties, such as illustrated in FIG. 3. The different materials may make it difficult to seal the common edge surface 25. For example, the common edge surface may include an edge surface of the first metallic layer 27, an edge surface of the second metallic layer 27', and an edge surface of the polymeric core layer 28.

Figure 4:
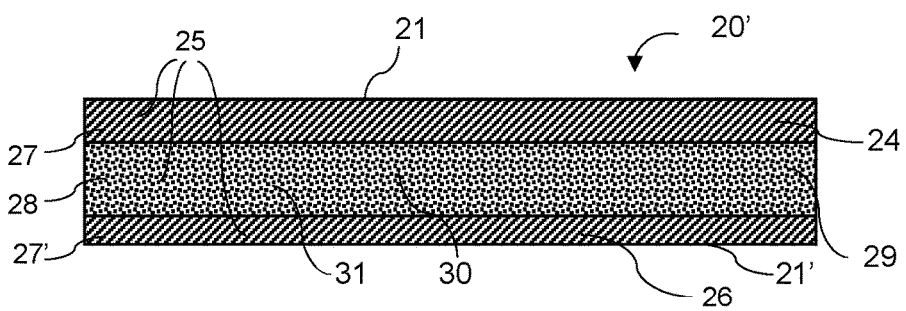
FIG. 4 is a side view of a laminate material including a polymeric core between two metallic layers. The polymeric core and the metallic layers share a common edge surface. The polymeric core includes a conductive material (preferably metallic particles or metallic fibers).

The polymeric core layer of a composite material substrate 20' may be formed of a filled polymeric material 30. The filled polymeric material may include a polymer and one or more fillers. Preferably, the filled polymeric material 30 includes metallic fibers and/or metallic particles 31, such as illustrated in FIG. 4. The composite material 20, 20' preferably is a sandwich composite. Preferably the thickness of the polymeric core layer is uniform along the length and the width of the sandwich composite.

Figure 5A:
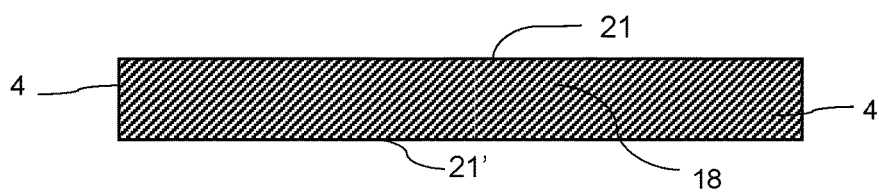
FIGS. 5A, 5B, 5C, and 5D illustrate a sequential covering of a substrate component with two or more different covering layers.
Figure 5B:
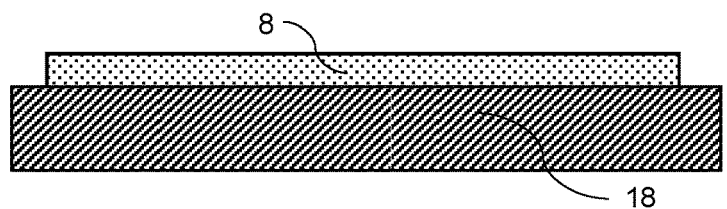
Figure 5C:
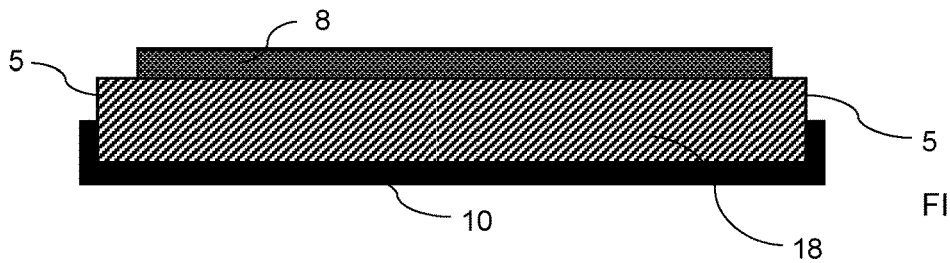
Figure 5D:
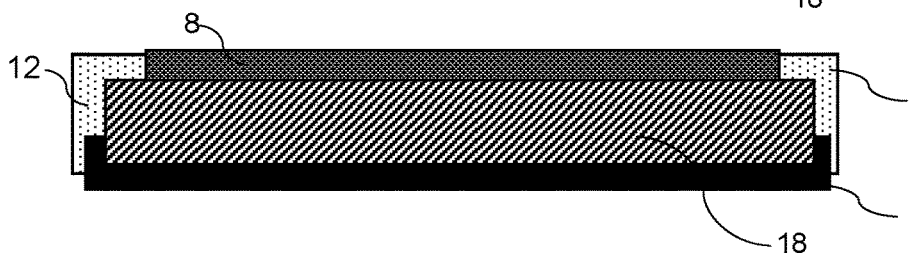

FIGS. 5A, 5B, 5C, and 5D are cross-sectional views illustrating a sequential covering of a substrate component with two or more different covering layers. FIG. 5A shows the substrate component 18 prior to covering. FIG. 5A shows one face surface of the substrate component covered 18. For example, a face surface of the substrate component 18 may be covered by a first polymeric covering layer 8. A different surface of the substrate 18 may be covered by a metallic covering layer 10, such as illustrated in FIG. 5C. A portion of the substrate 18 may remain uncovered after applying the metallic covering layer. For example, some or all of an edge surface may be uncovered. A second polymeric covering layer 12 may be used to cover some or all of the remaining surfaces of the substrate (i.e., that are not covered by the metallic covering layer 10 or the first polymeric covering layer 12). The second polymeric covering layer 12 preferably contacts both the first polymeric covering layer 8 and the metallic covering layer 10. The second polymeric covering layer 12 may cover a portion of the first polymeric covering layer 8 and/or a portion of the metallic covering layer 10.

Figure 6A:
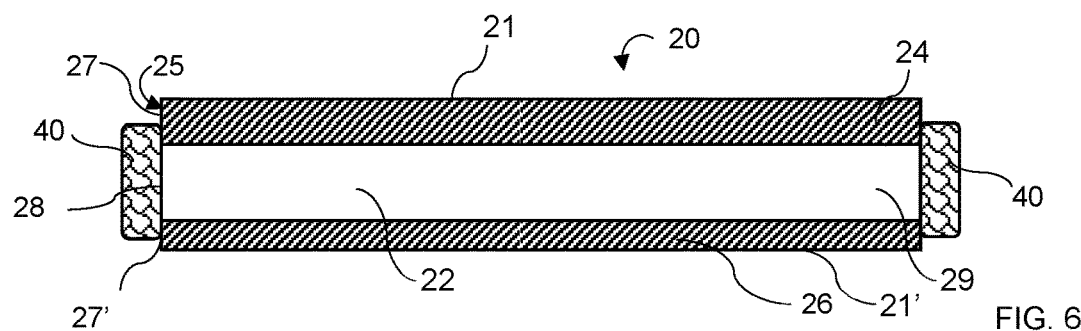
FIGS. 6A, 6B, and 6C illustrate various structures including a substrate component that is a laminate, illustrating advantages of using conductive material in the core layer and/or using a partial metallic plating layer over the edge of the core layer.
Figure 6B:
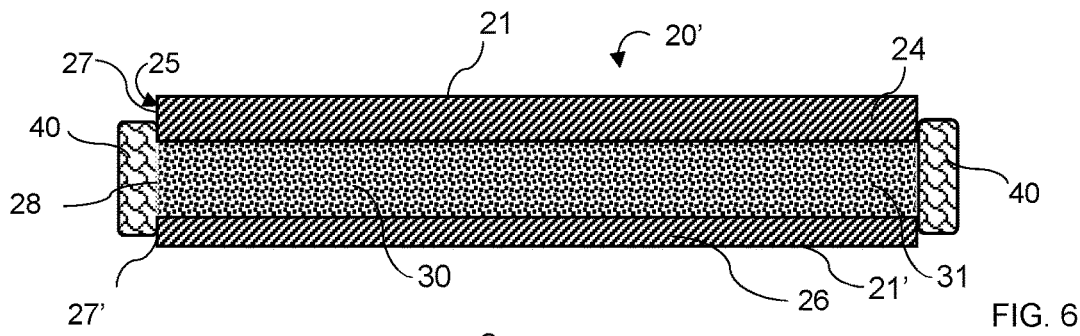

A composite material substrate 20 may be covered on an edge 25 with a polymeric covering layer 40, such as illustrated in FIG. 6A. Preferably, the polymeric covering layer covers the edge surface of the polymeric core layer 28 (preferably covering the entire thickness of the polymeric core layer). The polymeric covering layer preferably covers at least a portion of the edge surfaces of the metallic layers 27, 27'. The polymeric covering layer 40 preferably is a cross-linked polymeric coating. By using a filled polymeric material (preferably including metallic particle and/or metallic fiber) it may be possible to improve the adhesion between the polymeric covering layer 40 and the edge surface of the polymeric core layer 22, such as illustrated in FIG. 6B.

Figure 6C:
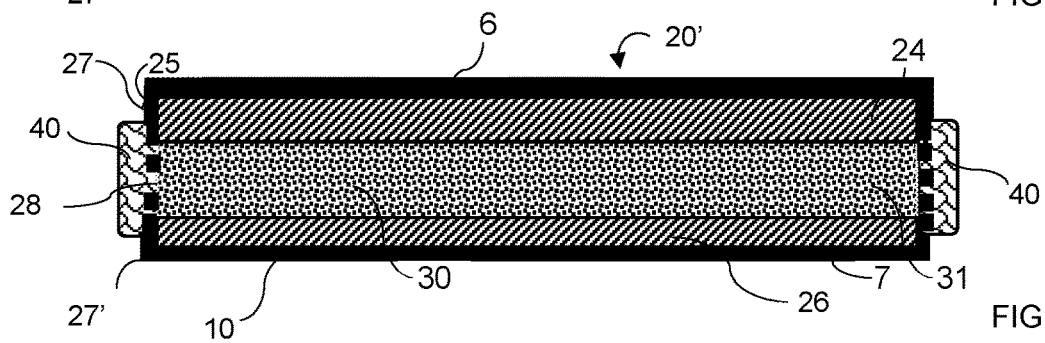
Figure 8A:
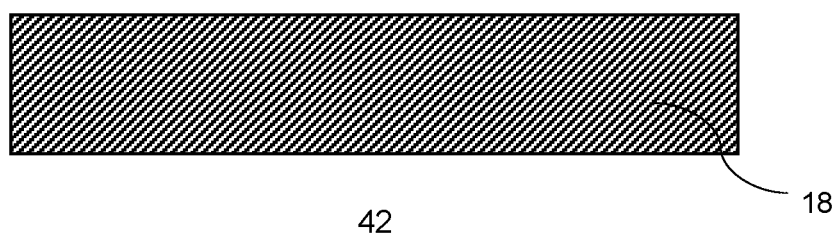
FIGS. 8A, 8B, 8C, and 8D are cross-sectional views showing the covering of a monolithic substrate component with three layers, where the substrate is covered with an anti-corrosion polymeric covering layer prior to plating with a metallic layer.
Figure 8B:
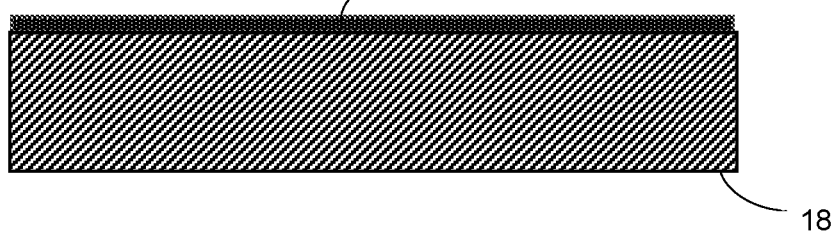
Figure 8C:
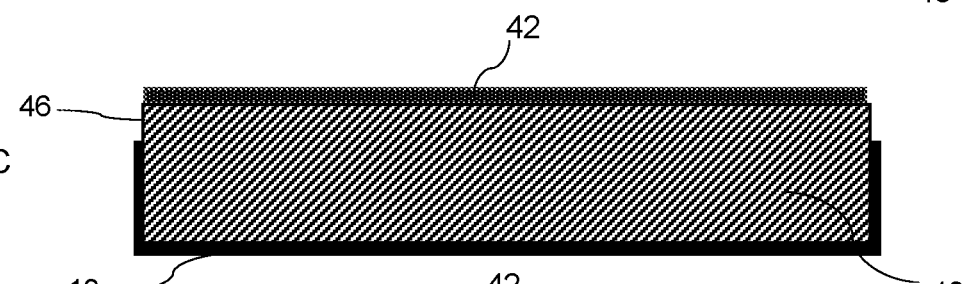
Figure 8D:
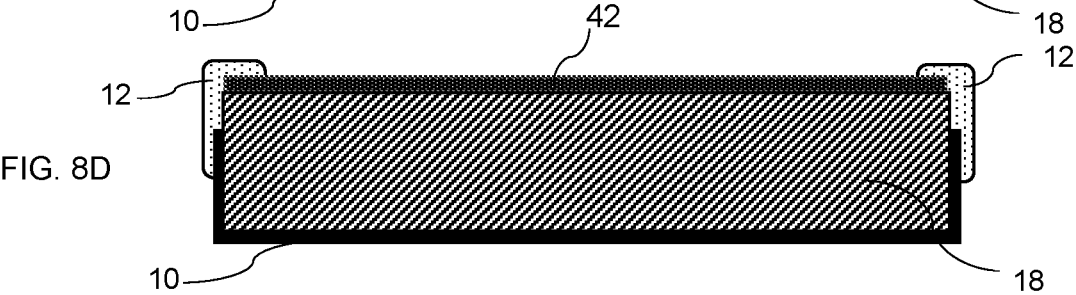
Figure 9:
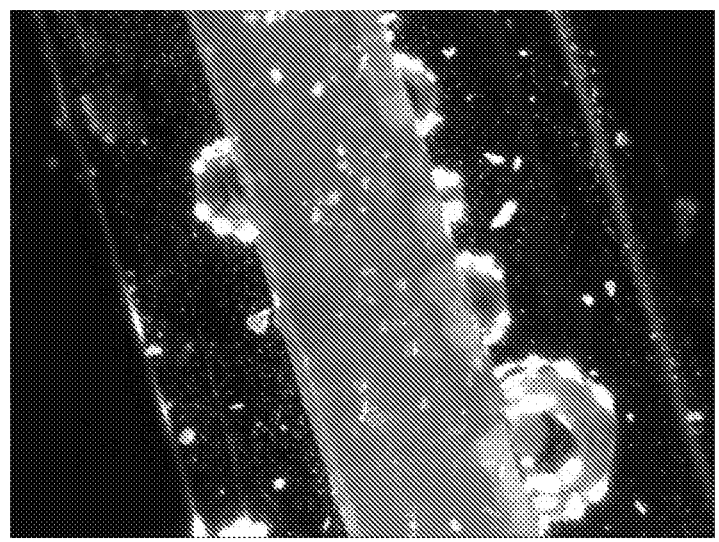
FIG. 9 is an illustrative optical micrograph of an edge surface of a sandwich composite after plating with nickel and chrome showing the lack of complete coverage over the edge surface in the region near the polymeric core layer. The polymeric core layer is free of metallic material.
Figure 10:
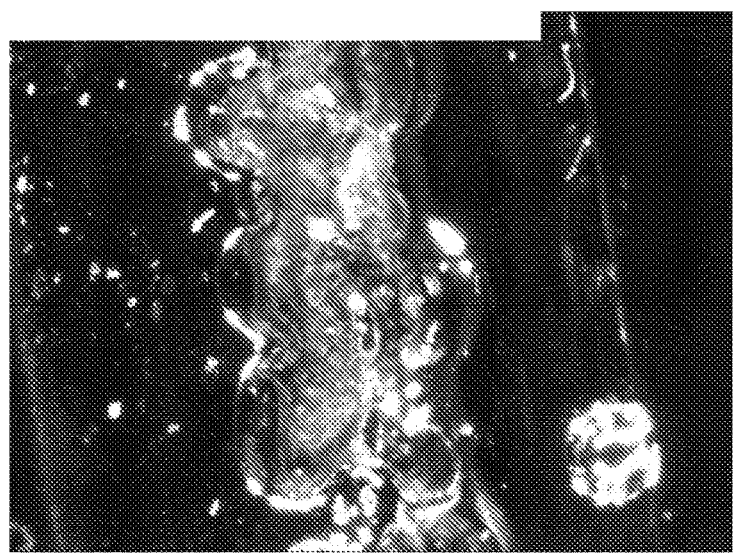
FIG. 10 is an illustrative optical micrograph of an edge surface of a sandwich composite after plating with nickel and chrome showing the lack of complete coverage over the edge surface, with a core layer including about 25 weight percent metal fibers.
Figure 11:
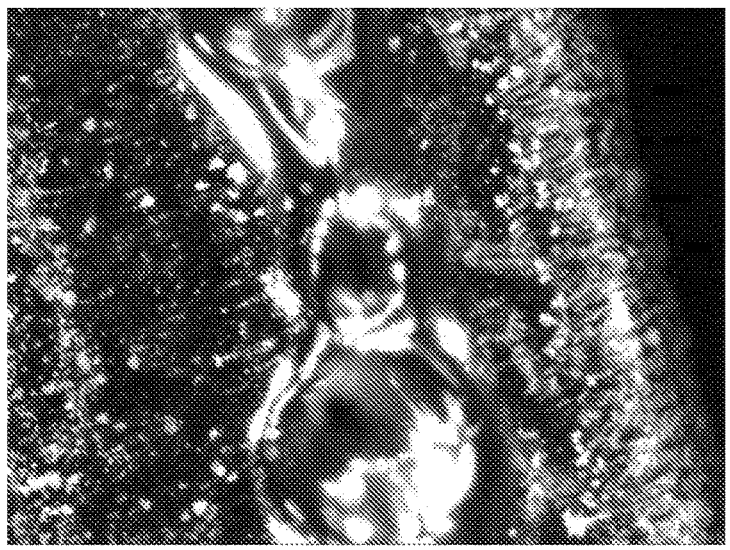
FIG. 11 is an illustrative optical micrograph of an edge surface of a sandwich composite after plating with nickel and chrome showing the lack of complete coverage over the edge surface, with a core layer including about 52 weight percent metal fibers.
Figure 12:
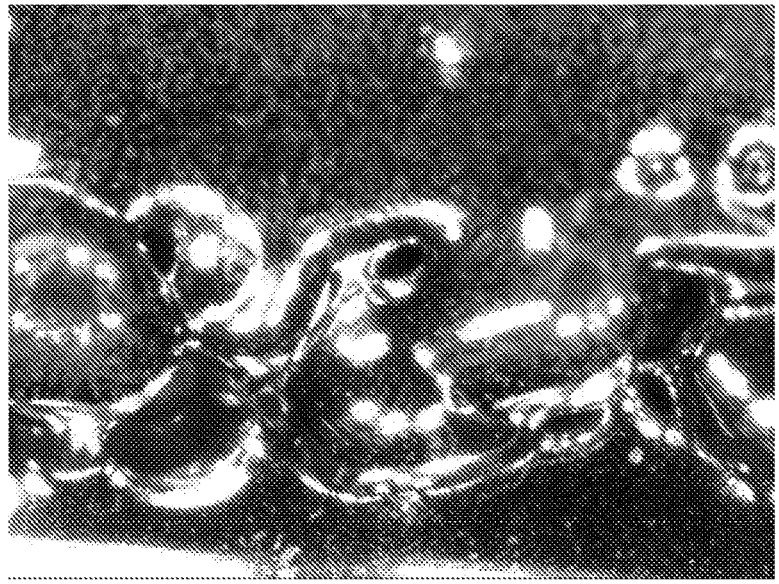
FIG. 12 is an illustrative optical micrograph of an edge surface of a sandwich composite after plating with nickel and chrome showing the lack of complete coverage over the edge surface, with a core layer including about 70 weight percent metal fibers.

A composite substrate 20' may be covered with a metallic covering layer 10 on one or more surfaces, including a first face surface, a second face surface, an edge surface, or any combination. As illustrated in FIG. 6C, when the metallic covering layer 10 is applied to the edge of the polymeric core layer, there may be regions which are not completely covered. A polymeric covering layer 40 may be used to seal the uncovered areas of the edge surface of the polymeric core layer.

The covering of a composite material (e.g., a laminate composite material) may require applying multiple coating layers to the substrate, such as illustrated in FIGS. 7A, 7B, 7C, and 7D. For example, one of the face surfaces may be covered with a polymeric covering layer 42. The polymeric covering layer preferably 42 is an anti-corrosion covering layer. The polymeric covering layer 42 may cover a portion of an edge of one of the metallic layers, such as illustrated in FIG. 7B. An opposing face surface may be covered with a metallic covering layer 10. The metallic covering layer may also cover a portion of the common edge surface, such as illustrated in FIG. 7C. A portion of the edge surface of the polymeric core layer 47 may be bare of the metallic covering layer, as such, there is only a partial metallic covering layer 10' in this region. There may be a uncovered (i.e., bare) gap 46 between the metallic covering layer 10 and the polymeric covering layer 42. This may be a result of the polymer covering layer interfering with the metallic covering process (e.g., due to electrostatic, surface energy, or other phenomenon). A second polymeric covering layer may be applied over the edge surface to cover the regions 46, 47 which were bare. FIG. 7E illustrates a variation of FIG. 7D. As illustrated in FIG. 7E, an anti-corrosion polymeric covering layer may partially cover only one of the face surfaces without covering an edge surface of the metallic layer. As illustrated in FIG. 7E, a polymeric coating layer may extend onto a face surface of a metallic layer. A similar multi-coating process may also be applied to a substrate formed of a monolithic metal, such as illustrated in FIGS. 8A, 8B, 8C, and 8D.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of a composition" also contemplates a teaching of ranges of same recited amount of "x" in percent by weight of the resulting composition.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

EXAMPLES

Comparative Example 1

In Comparative Example 1, a 100 mm×160 mm specimen is cut from a sheet of cold rolled steel having a thickness of about 0.8 mm. The specimen is cleaned with an alkaline cleaner and rinsed. After the rinsing, the specimen is treated with iron phosphate to passivate the surface. One side of the specimen is covered with an anti-corrosion polymeric material to form an over layer. The covered specimen is then plated with a metallic coating with a nickel using a nickel dip process. The nickel covers the uncoated surfaces (i.e., the surfaces that are free of the anti-corrosion polymeric material) except for the regions surrounding the polymeric over layer. Without being bound by theory, it is believed that the relatively low surface energy and/or the relatively low electrical conductivity of the anti-corrosion polymeric layer (relative to the steel or the passivated steel) prevents the nickel from fully covering the metal surface surrounding the polymeric coating. The resulting specimen has a gap of "uncoated steel" (i.e., not covered with either the anti-corrosion polymeric material or the nickel) or a gap of "inadequately coated steel" (i.e., plated, but too a much lower and insufficient level than the regions further from the anti-corrosion polymeric over layer) between the surface covered with the polymeric covering and the surfaces fully plated with the nickel. When exposed to corrosion testing, the specimen corrodes in the region of this gap.

Comparative Example 2

Comparative Example 2 is prepared using the same method as Comparative Example 1, except the specimen is covered with chrome (a chrome plating layer) after covering with the nickel. Although a portion of the gap between the anti-corrosion polymeric over layer and the nickel plating is covered with the chrome, this chrome covering is non-uniform and incomplete in this gap region. In general, the chrome adheres only to the nickel and amplifies any weakness in the adhesion of the nickel to the substrate in the gap region. When exposed to corrosion testing, the specimen corrodes in the region of the gap. Even application of one or more additional chrome layers results in a gap region having incomplete or weak covering.

Example 3

Example 3 is prepared using the same method as Comparative Example 1, except the region of the gap is covered with a polymeric coating layer (e.g., a primer layer). The polymeric coating layer has a thickness of about 0.2 mm and covers the entire gap and extends about 2 mm over the region of the anti-corrosion polymer covering and about 1 mm over the bordering nickel plating. The polymeric coating layer is applied as a low viscosity liquid and is then cross-linked so that the polymeric coating layer does not flow. When exposed to corrosion testing, there is no visible corrosion in the region of the gap, now covered with the polymeric coating layer. Example 4 is prepared using the same method as Comparative Example 2, except the region of the gap is covered with a polymeric coating layer (e.g., a primer layer). The polymeric coating layer has a thickness of about 0.2 mm and covers the entire gap and extends about 2 mm over the region of the polymeric covering and about 1 mm over the bordering chrome covering (e.g., chrome plating). The polymeric coating layer is applied as a low viscosity liquid and is then cross-linked so that the polymeric coating layer does not flow. When exposed to corrosion testing, there is no visible corrosion in the region of the gap, now covered with the polymeric coating layer.

Comparative Example 5-10

Comparative Examples 5, 6, 7, 8, 9 and 10 are prepared using a sandwich composite material. The sandwich composite has a top sheet of steel having a thickness of about 0.6 mm, a bottom sheet of steel having a thickness of about 0.3 mm and a polymeric core layer of about 0.5 mm. The total thickness of the sandwich composite material is about 1.4 mm. The composite material has face surfaces that are formed of the steel sheets and has edge surface where the polymeric core layer is exposed between the steel layers.

In comparative example 5, the polymeric core layer consists of polyolefins, and is free of any metallic materials.

In comparative example 6, the polymeric core layer includes about 25 weight percent CRS (i.e., cold rolled steel) steel fibers and about 75 weight percent polyolefins.

In comparative example 7, the polymeric core layer includes about 52 weight percent CRS steel fibers and about 48 weight percent polyolefins.

In comparative example 8, the polymeric core layer includes about 70 weight percent CRS steel fibers and about 30 weight percent polyolefins.

In comparative example 9, the polymeric core layer includes about 52 weight percent stainless steel powder and about 48 weight percent polyolefins.

In comparative example 10, the polymeric core layer includes about 52 weight percent copper powder and about 48 weight percent polyolefins.

Comparative Examples 5, 6, 7, 8, 9, and 10 are evaluated for ability to cover with a chrome plating. A 100 mm×160 mm specimen is cut from each sandwich composite. The specimen is cleaned with an alkaline cleaner and rinsed. After the rinsing, the specimen is treated with iron phosphate to passivate the surface. The specimen is covered with a nickel plating using a nickel dip process. Each specimen is then plated with a chrome plating. The chrome and nickel platings covers the entirety of the steel face surfaces and part of the steel edge surfaces. However, the metal platings do not completely cover the polymeric core layer or the regions of the edges of the metal layers near the polymeric core layer. FIGS. 9, 10, 11, and 12 are optical micrographs of Comparative Examples 5, 6, 7, and 8, respectively, showing the poor coverage of the metal coatings on the edge surfaces near the polymeric core layer. Comparative Examples 5, 7, 9, and 10 are tested for corrosion resistance. Four specimens are tested for each material. The average corrosion rating for each material is shown in the Table below:

| | Comparative Example 5 | Comparative Example 7 | Comparative Example 9 | Comparative Example 10 |
|---|---|---|---|---|
| Filler | None | CRS fiber | SS powder | Cu powder |
| Corrosion rating | 1 | 1 | 3 | 2 |

Corrosion rating scale is based on the percent of the edge surface that is covered with rust. A rating of 1 is the lowest performance (76-100% rust), a rating of 2 corresponds to 51-75% rust, a rating of 3 corresponds to 26-50% rust, a rating of 4 corresponds to 0-25% rust, and a rating of 5 is the highest performance (i.e., no rust).

Examples 11, 12, 13, and 14

Example 11 is prepared according to Comparative Example 5, Example 12 is prepared according to Comparative Example 7, Example 13 is prepared according to Comparative Example 9, and Example 14 is prepared according to comparative Example 10; except in each example, a polymeric coating layer is applied over the edge surfacing including over the polymeric core layer. The polymeric coating layer is a primer layer and includes polar polymers (e.g., polymers including one or more of the following in some or all of the monomer units: oxygen atoms, nitrogen atoms, sulfur atoms, or halogen atoms). The polymeric coating layer has a thickness of about 0.2 mm and covers the entire edge surface and wraps around to cover about 1-2 mm of the face surfaces. Examples 11-14 are tested for corrosion resistance. Four specimen are tested for each material. The average corrosion rating for each material is shown in the Table below:

| | Example 11 | Example 12 | Example 13 | Example 14 |
|---|---|---|---|---|
| Filler | None | CRS fiber | SS powder | Cu powder |
| Corrosion rating | 5 | 5 | 5 | 5 |

Examples 11, 12, 13, and 14 are tested for adhesion of the polymeric cover layer to the edge surface. Examples 12, 13, and 14 are expected to have improved adhesion due to the metallic material in the polymeric core layer of the composite material.

Examples 15, 16, 17, and 18

Examples 15, 16, 17, and 18 are prepared according to Examples 11-14 except prior to plating with the nickel, one of the face surfaces is covered with an anti-corrosion polymeric over layer. The resulting specimens have one surface covered with the anti-corrosion polymeric over layer, the other face surface covered with the nickel and chrome platings, and the edge surface is partially covered with the metal platings and completely covered by the polymeric coating (e.g., the primer). Examples 15, 16, 17, and 18 are tested for corrosion resistance. Four specimen are tested for each material. The average corrosion rating for each material is shown in the Table below:

| | Example 15 | Example 16 | Example 17 | Example 18 |
|---|---|---|---|---|
| Filler | None | CRS fiber | SS powder | Cu powder |
| Corrosion rating | 5 | 5 | 5 | 5 |

LIST OF REFERENCE NUMERALS

2 Coated article
4 Edge surface
5 Bare surface of the substrate component
6 First face surface
7 Second face surface
8 First polymeric covering layer (e.g., polymeric laminate over layer, such as a layer of an anti-corrosion polymeric material).
10 Metallic covering layer (e.g., plating layer, preferably including a chrome plating and/or a nickel plating)
10' Partial metallic cover layer (e.g., partial coating over the filled polymeric material of the polymeric core layer).
12 Second polymeric covering layer (e.g., polymeric coating layer, such as a primer layer, a base coat layer, a top coat layer, or any combination thereof).
14 Covering or plating on an edge surface
16 Covering or plating on a face surface
18 Substrate component (e.g., monolithic metal layer).
20 Substrate component (e.g., composite material)
20' Substrate component including a core polymeric layer that is a filled polymeric material having metallic fibers, metallic particles, or both.
21, 21' Face surfaces of the substrate component
22 Polymeric core layer
24 First metallic layer (e.g., steel sheet, aluminum sheet, or other metallic sheet).
25 Common edge surface
26 Second metallic layer (e.g., steel sheet, aluminum sheet, or other metallic sheet).
27 Edge surface of the first metallic layer
27' Edge surface of the second metallic layer
28 Edge surface of polymeric core layer
29 Polymer (preferably a non-polymer polymer)
30 Filled polymeric material
31 Metallic fibers and/or metallic particles
40 Polymeric covering layer (preferably a cross-linked polymeric coating).
42 Polymeric laminate over layer (preferably an anti-corrosion covering layer).
46 Bare surface of metallic layer adjacent to the polymeric laminate over layer (i.e., region of metallic layer 24 that is not covered by the core metallic cover layer 10).
47 Bare edge surface of the filled polymeric material of the core layer.

What is claimed is:
1. A method of forming a coated article comprising the steps of:
   i) providing a bare article having a first metallic face surface and an opposing second metallic face surface, and having an edge surface;
   ii) covering the first metallic face surface with a layer of an anti-corrosion polymeric material;
   iii) plating the second metallic face surface with one or more metallic plating layers to form a plated article having a plated surface, wherein the plated article has a bare surface between the plated surface and the surface coated with the anti-corrosion polymeric material, wherein the bare surface is generally free of the anti-corrosion polymeric material and is either free of the one or more metallic plating layers or includes only partial plating;

iv) coating the bare surface with one or more polymeric coatings.

2. The method of claim 1, wherein the bare article is a monolithic metal article.

3. The method of claim 1, wherein the bare article includes a composite including metal layers and a polymeric core layer having metal particles and/or metal fibers, wherein the edge surface includes an edge surface of the metal layers and an edge surface of the polymeric core layer.

4. The method of claim 3, wherein the bare surface includes at least a portion of an edge of the composite including the polymeric core layer.

5. The method of claim 3, wherein the polymeric core layer includes a non-polar polymer and the polymeric coating includes a polar polymer.

6. The method of claim 3, wherein the polymeric core layer includes a sufficient amount of the metal fiber and/or metal particles for partial adhesion of the plating to the edge surface of the polymeric core layer.

7. The method of claim 3, wherein the step of covering the first metallic face surface is before the step of plating the second metallic face surface.

8. The method of claim 1, wherein a thickness of the layer of the anti-corrosion polymeric material is about 1 mm or less.

9. The method of claim 1, wherein substantially all of the surfaces of the bare article are covered by any combination of the anti-corrosion polymeric material, the metallic plating layer, or the polymeric coating.

10. The method of claim 9, wherein a first metallic layer of the one or more metallic plating layers has a thickness less than a thickness of a second metallic layer of the one or more metallic plating layers.

11. The method of claim 1, where the one or more metallic plating layers includes a chrome plating layer; and the one or more polymeric coatings includes a primer material.

12. A coated article prepared by the method of claim 1.

13. A method comprising the step of
i) covering a first face surface of a composite material with a layer of an anti-corrosion polymeric material; wherein the composite material includes a first metal layer, a second metal layer, and a polymeric core layer between the first and second metal layers, wherein the polymeric core layer includes a non-polar polymer, and metal particles and/or metal fibers, wherein the composite material includes the first face surface, an opposing second face surface, and an edge surface of the polymeric core layer;
ii) plating at least the second face surface of the composite material with one or more metal containing plating layers;
iii) coating the edge surface of the polymeric core layer with a polymeric coating including a polar polymer.

14. The method of claim 13, wherein the edge surface of the polymeric core layer is at least partially coated by the plating layer(s).

15. The method of claim 14, wherein the polymeric core layer includes a sufficient amount of the metallic fibers and/or the metallic particles so that the plating layer(s) at least partially adheres directly to an edge surface of the polymeric core layer.

16. The method of claim 15, wherein the composite material is entirely encased by a combination of the anti-corrosion polymeric coating layer, the polymeric coating, and the plating layer(s).

17. The method of claim 14, wherein a first metallic layer of the one or more metal containing plating layers has a thickness less than a thickness of a second metallic layer of the one or more metal containing plating layers.

18. The method of claim 1, wherein the polymeric coating includes a tracer compound and the method includes detecting the tracer compound to confirm the presence of the polymeric coating.

19. The method of claim 13, wherein the polymeric coating includes a tracer compound and the method includes detecting the tracer compound to confirm a presence of the polymeric coating.

20. A coated article prepared by the method of claim 13.

* * * * *